United States Patent [19]
Mark et al.

[11] Patent Number: 5,074,664
[45] Date of Patent: Dec. 24, 1991

[54] COMPUTER GENERATED CAVITY LENGTH CONTROL WITH AUTOMATIC GAIN CONTROL FOR RING LASER GYROS

[75] Inventors: John G. Mark, Pasadena; Daniel A. Tazartes, West Hills, both of Calif.

[73] Assignee: Litton Systems Inc., Beverly Hills, Calif.

[21] Appl. No.: 640,179

[22] Filed: Jan. 11, 1991

[51] Int. Cl.$^5$ .................................... G01C 19/66
[52] U.S. Cl. ............................................ 356/350
[58] Field of Search ............................. 356/350

[56] References Cited

U.S. PATENT DOCUMENTS 4,781,462 11/1988 Ferriss et al. .................. 356/350

Primary Examiner—Vincent P. McGraw
Attorney, Agent, or Firm—Roy L. Brown

[57] ABSTRACT

A ring laser gyro having a ring laser that preferably has four legs and four corner mirrors. At least one of the corner mirrors is partly transmissive, and the transmitted beam is sensed and converted into a digital signal. The digital signal is fed back in two computer loops to at least one digital-to-analog converter, and thence to a transducer which drives at least one corner mirror inward and outward. One of the computer loops includes a stepped demodulator having four steps per cycle. The steps have voltages at the operating voltage of the transducer, that voltage plus an increment, the operating voltage, and that voltage less a decrement. The first loop sends an operating voltage to the digital-to-analog converters. The second loop demodulates the beam signal at a second harmonic of the demodulation of the first loop to produce a voltage signal which controls the amplitude of dithering of the movable mirrors. A stepped modulator, in synchronism with the demodulator of the first loop, delivers a modulation signal to the digital-to-analog converters to step the movable mirrors. The operating voltage moves the mirrors into a position wherein the laser cavity operates at its intensity mode peaks.

11 Claims, 4 Drawing Sheets

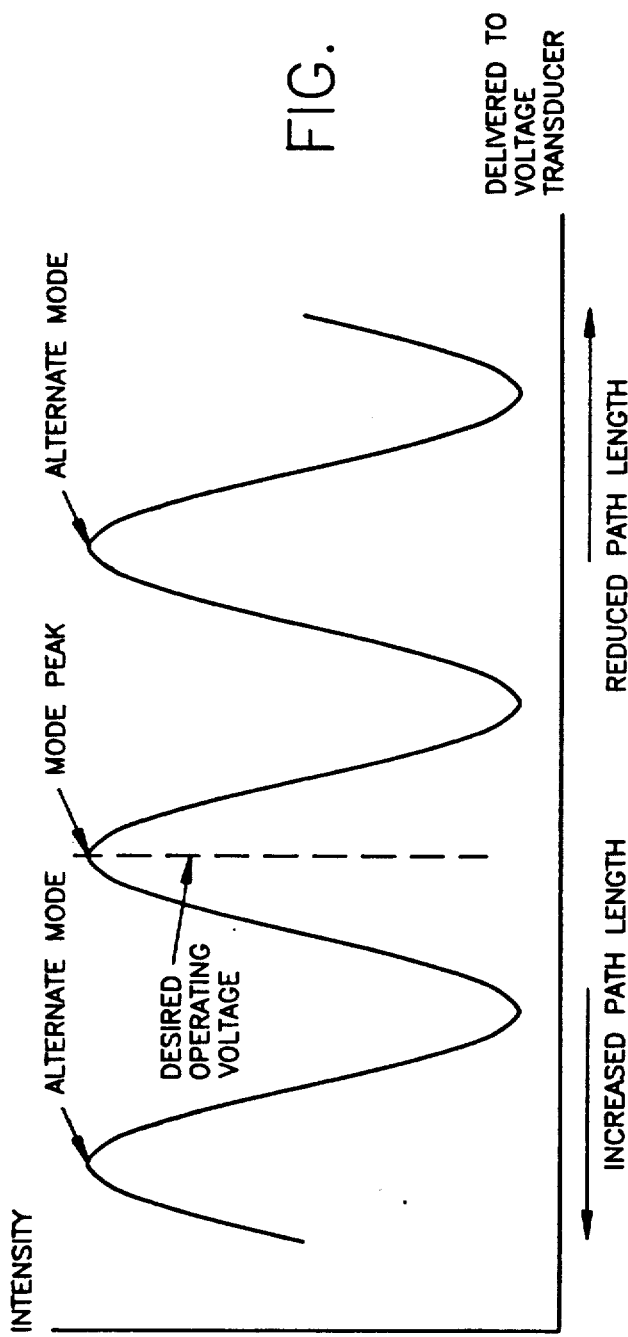
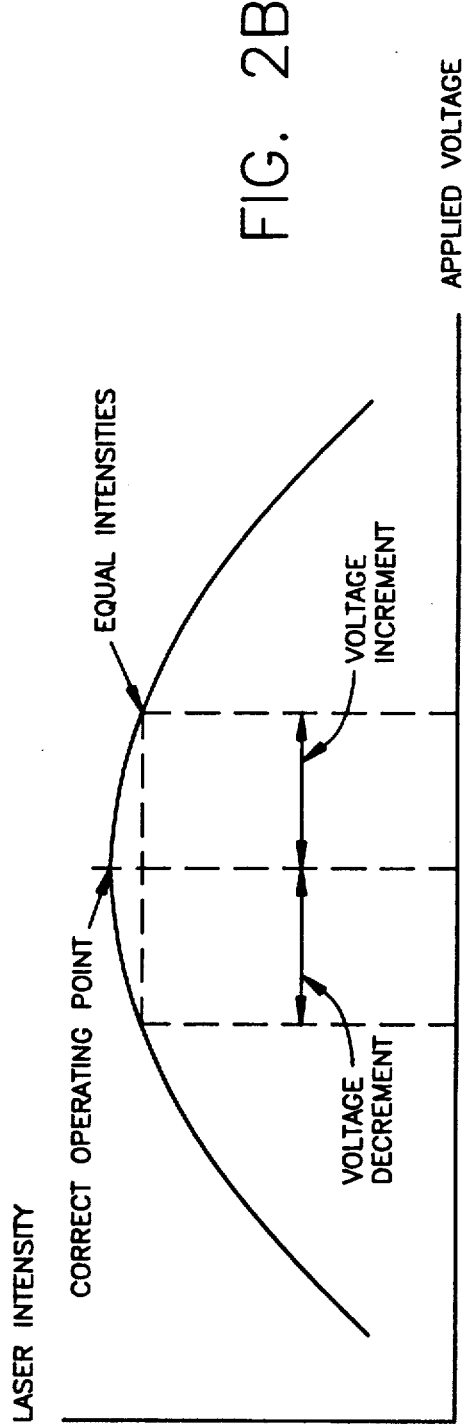

COMPUTER GENERATED CAVITY LENGTH CONTROL WITH AUTOMATIC GAIN CONTROL FOR RING LASER GYROS

BACKGROUND OF THE INVENTION

This invention pertains to controlling the cavity length of a ring laser, and particularly for such ring laser that is used in a ring laser gyro. This invention is believed properly to be classified in United States class 356, subclass 350.

A ring laser gyro uses a ring laser having two laser beams which are propagating in two directions around a ring laser path. A ring laser gyro superimposes portions of the counterpropagating beams against each other to produce interference fringes which are counted as measures of angular displacement and velocity of the ring laser about a sensing axis.

To achieve a consistent calibration of the gyro, it is essential that the physical lengths of the paths be maintained. To maintain the physical lengths, the ring laser cavity is preferably imbedded in a dimensionally stable laser block.

The ring laser has a closed laser path in three or more intersecting bores, containing a laser gas such as a helium-neon mixture, within the temperature-stable material. Mirrors at the intersection of the bores are called, "corner mirrors." For convenience of explanation, the ring laser is described with four mirrors and four bores, cavities, or legs.

A Ring Laser Gyro is here described with a ring laser having two counterpropagating beams traveling around the laser path. At least one of the corner mirrors transmits a very small amount of the counterpropagating laser beams to an optical system which usually uses prisms to collect and superimpose them. A sensor senses the interference fringes produced by the superimposed beams, and electronics apparatus responsive to the detected signals counts the fringes and computes the fringe rate, angular displacement, and angular velocity of the laser about a predetermined axis.

One significant problem in ring lasers arises in tuning the ring laser cavity to the correct length to support the resonant modes of the counterpropagating beams. The inward-outward position of at least one of the corner mirrors is adjustable to control the cavity length of the ring laser. Although only one adjustable mirror is needed, the apparatus is described in a preferred embodiment with two adjustable mirrors which increases the range of adjustment of the cavity length.

The partly transparent corner mirror may be any mirror, but it is preferably not one of the movable mirrors. The beams extracted through the partly transparent mirror interfere and produce a series of moving interference bars or fringes whose count is a measure of the angular displacement sensed by the instrument.

Another partly transparent corner mirror, similar to the one discussed above, uses a beam detecting system that produces an electrical signal which is a measure either of one beam intensity or of the sum of the intensities of the two counterpropagating ring laser beams. The magnitude of the detected signal depends upon the tuning of the cavity, and it is a feature and one of the main objects of the invention to tune the cavity to the maximum intensity of the laser beams.

If desired, intensity and angular information can both be derived from the signal through a single partly transmissive mirror.

A transducer, preferably a piezoelectric transducer having driving electrodes, forces the movable mirrors inwardly or outwardly, and the amount of inward or outward motion depends upon the voltage delivered to the electrodes.

The scale factor between the amount of voltage applied to the transducer electrodes and the excursion of travel of the mirror attached to the transducer, varies with many factors including but not limited to temperature of the mirror and the transducer, the compliance of the flexure springs supporting the transducer, and the bonding of those flexures. As the transducer scale factor varies, the ratio of its applied control voltage to the corresponding excursion of its attached movable mirror varies, and the amount of voltage change to move the movable mirror inwardly and outwardly to change the cavity length by one laser beam wavelength also varies.

A computer, usually the system computer used for the ring laser, generates digital words or bytes, converts them into an analog signal, and delivers them to control the inward and outward position of the piezoelectric transducer and its attached movable corner mirror. The lasing intensity peaks at inward-outward positions of the movable corner mirror corresponding to cavity lengths that are separated by a distance of one wavelength of the laser beam.

In earlier times, cavity length control was achieved using a "hill climbing" servo which employed analog modulation of the mirror transducer drive voltage followed by analog demodulation of the intensity signal. The modulation/demodulation took place at a fairly high frequency (e.g. six kilohertz). The servo could then be closed via an analog loop which fed back a control voltage which was dependent on the output of the demodulator. A stable operating condition was achieved when the demodulator output was zero on average.

Later, the servo operations were performed by the system computer. An analog-to-digital converter was used to deliver the output signal of the demodulator to the computer, and a digital-to-analog converter was used to allow the computer to command the control voltage. The apparatus still relied upon the basic six kilohertz (or equivalent) analog modulation and demodulation to produce an error signal for operation of the control loop.

A study revealed that, because of variations in the sensitivity of piezoelectric transducers and of other mirror and gyro parameters, such servo loops exhibited very large loop gain variations, thereby leading to inconsistent controller performance and often long convergence times.

BRIEF DESCRIPTION OF THE INVENTION

The initial mirror position may be arbitrary, and the cavity length is variable. A means for locating and tracking the peak intensity of the laser intensity as a function of movable mirror position is part of the invention.

Because of the large variation in many of the parameters within the primary cavity length control loop, it is desirable to obtain a measure of the gain and also compensate for the gain variations, thereby stabilizing the laser intensity to its maximum value in all ring lasers which are within predetermined manufacturing specifications.

The gain is measured by observing the value of laser intensity at various voltages delivered to the movable mirror transducers. In the apparatus of the invention, instead of delivering a conventional analog modulation voltage to the transducers, a tri-state stepped voltage is delivered. The tri-state modulation uses only added, subtracted and zero voltage steps. The incrementing and decrementing voltages are preferably substantially equal in amplitude. The frequency of the modulating voltage steps is relatively low compared to the frequencies used in analog modulation. A full stepped modulation cycle consists of four voltage steps in preferably substantially equal time segments.

It should be noted that the frequency of stepped demodulation of the secondary control loop is twice the frequency of the stepped modulation frequency. That is, its full demodulation cycle consists of only two of the time segments: a segment incrementing the operating voltage, alternating with a segment decrementing the operating voltage. Thus, two full demodulation cycles of that second control loop occur within one modulation cycle.

The demodulation of the second control loop is characterised as a second harmonic demodulation and gain measurement technique.

The modulation and demodulation techniques in analog modulation and demodulation are more complex than the tri-state modulation of this invention. Although less accurate and efficient than the tri-state modulation, prior art analog control loops also can be enhanced using a second control loop demodulating at the second harmonic of the modulating frequency.

Thus, we propose, as one feature of the invention, a means and method for achieving a relatively stable overall loop gain, using a secondary feedback path to measure the curvature of the intensity vs applied voltage function, extracting the second harmonic of the modulating signal, and compensating for variations in the curvature.

The apparatus and method of this invention control both cavity length and servo gain to eliminate analog modulation and demodulation hardware, eliminate high frequency analog modulation of the mirror position, and reduce variations in the servo loop gain.

The apparatus of the invention delivers low frequency increments and decrements to the mirror positions by a digital-to-analog converter. The sequence of increments and decrements to the mirror positions produces either increment/decrement or decrement/increment laser intensity sequences in the laser intensity unless the operating position of the mirrors is at a peak intensity point of the laser signal. When the operating positions of the mirrors are at a peak intensity mode, equal incrementing-decrementing of the mirror positions around the operating position produces equal variations in the laser intensity, both reducing the intensity from its peak value.

Delivering a three amplitude, four time-sequence pulse, such as increment/no-increment/decrement/no-decrement voltage to the mirror transducers produces laser intensity signals that are used to determine both the transducer voltage error and the voltage increment-/decrement step size needed to produce a predetermined intensity excursion of the ring laser signal. The primary servo loop gain is determined and controlled to a desired constant amplitude by a second servo loop.

It is therefore a feature and object of this invention to adjust inwardly and outwardly movable corner mirrors of a ring laser to produce a maximum intensity ring laser beam.

It is a feature and object of this invention to control the length of the path of a ring laser to cause the ring laser to operate substantially at its maximum beam intensity.

It is also a feature and object of this invention to control the amount of voltage change required to achieve a predetermined intensity change of the laser and to use measurements of the intensity change to control the gain of the primary cavity length controlling means of the laser.

It is another feature and object of this invention to use simple incrementing and decrementing modulation sequences to the inward-outward motion of at least one corner mirror of a ring laser for use in a ring laser gyro.

It is likewise a feature and object of this invention to use a second control loop demodulating the laser intensity signal at the second harmonic frequency of the modulating signal to stabilize the servo control loop for path length control of a laser.

Other objects will become apparent from the following description, taken together with the accompanying drawings.

BRIEF DESCRIPTION OF THE DRAWINGS

FIGS. 2A, 2B, 2C, and 2D are graphs showing the effects of mirror transducer drive voltage changes upon laser intensity.

DETAILED DESCRIPTION OF A PREFERRED EMBODIMENT

Equations and their derivations appear in the "Appendix" at the end of the specification.

Figure 1:
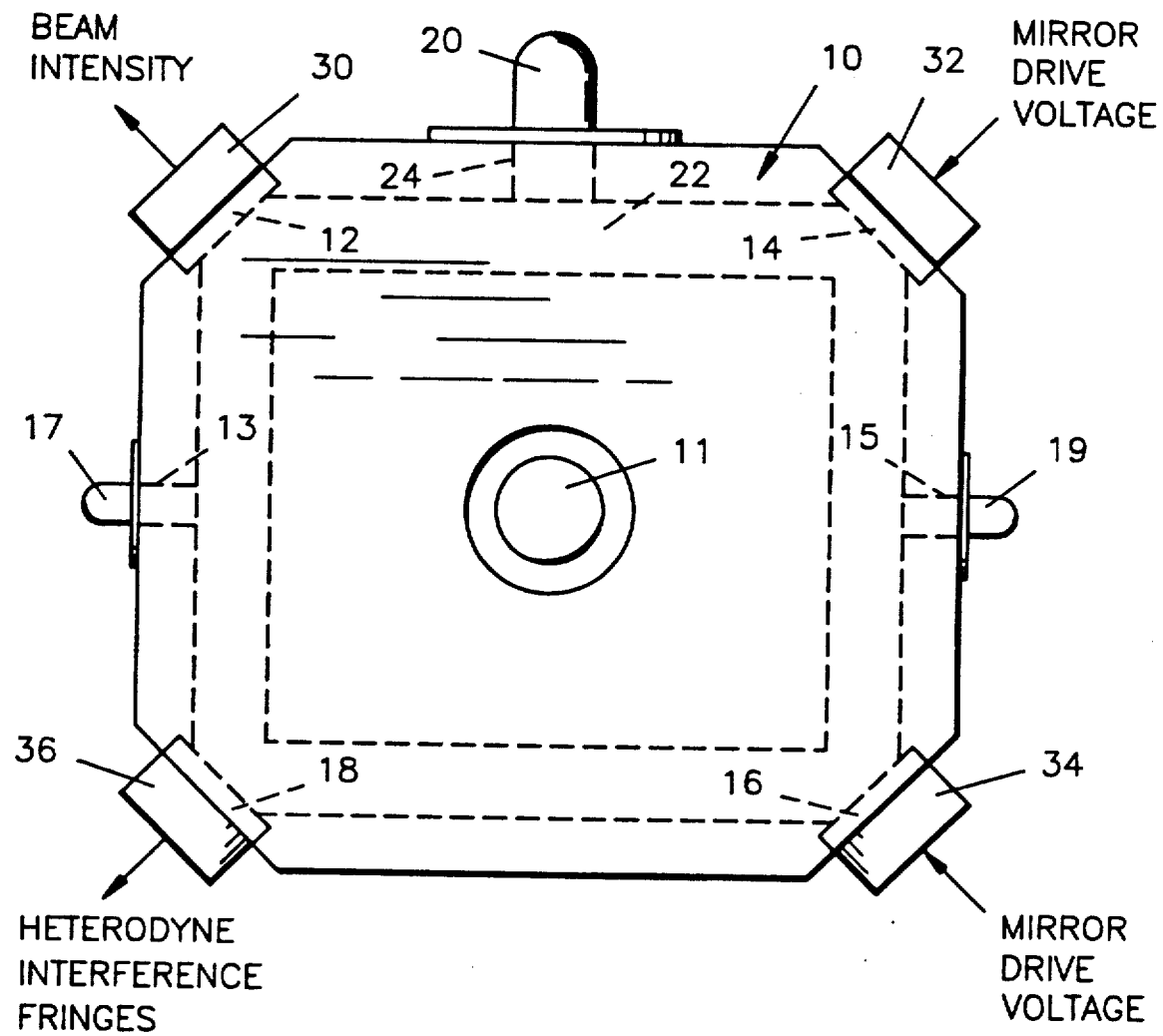
FIG. 1 is a plan view of one embodiment of a ring laser.

FIG. 1 is a plan view of a four sided ring laser gyro. Preferably laser block 10 is dimensionally stable. A ring laser may have as few as three legs, and it may have more than four legs, but the preferred embodiment has four legs. Usually the block 10 is rectangular, but the outside shape of the block is not important. Formed in the block 10 is a laser bore 22 which forms a generally rectangular laser path and which is filled with a gas that is frequently a helium-neon mixture. The bore forms a path for the ring laser beam.

A ring laser may be stimulated, for example, from a light source, from a radio frequency source, or from a constant source of energy. In the shown embodiment, a cathode electrode 20 extends from the side of the block 10 to receive a negative voltage. Two anodes 17, 19 are symmetrically positioned relative to the cathode 20, and they also extend from the side of the block 10 to receive a positive voltage. The positive anodes 17 and 19 are positioned in the middle of opposite legs of the ring laser bore 22. The electrodes 20, 17 and 19 contact the laser gas through cavities 24, 13 and 15, respectively. When a voltage is applied between the anodes 17, 19 and the cathode 20, the central position of the cathode in the middle of one of the ring laser legs between the anodes 17 and 19, causes symmetrical electron and ion flow between the cathode and the anodes through the laser gas in opposite directions through the cavity 22.

The portions of the cavity 22 between cavity 24 and cavities 13 and 15 are called the gain bores. The flows of ions and electrons in the gain bores stimulate counterpropagating laser beams around the ring laser beam path in the cavity 22.

The mirrors 12, 14, 16, 18 at the intersections of the legs of the ring laser are called corner mirrors. Mirrors 12 and 18 allow very small amounts of the laser beams to be transmitted to optical elements and photoelectric sensors (not shown in detail). The counterpropagating beams combine in the optical system 36 to produce interference fringes which are sensed and delivered as electrical pulses. The pulses are counted by computer means(not shown in detail) to obtain a measure of the angular displacement and/or angular velocity of the apparatus about its sensing axis.

Further details of the operation of the ring laser used as an angle measuring instrument need not be herein further described, for the invention pertains to controlling the cavity length or tuning of the ring laser.

The apparatus of this invention is directed to tuning the ring laser cavity to a length for maximum intensity of the laser beams. In one embodiment (not shown) both beams are sensed, and the electrical signals from their sensors are combined to produce, alternatively, a measure of the sum of the intensities or a measure of an average of the intensities. Herein, a single beam is sensed, for the cavity length that produces a maximum intensity in one beam also produces a maximum intensity in the other beam.

The mirrors 14 and 16 are movable inwardly and outwardly in response to their received drive voltages. The transducers 32 and 34 for moving the mirrors must be such that they do not tilt the mirrors. Transducers using piezoelectric wafers, or PZTs, are available. One preferred piezoelectric transducer, for example, uses a circular piezoelectric wafer (not shown) with electrodes (not shown) on both opposing surfaces. It is fitted into its housing with its radially outer edges fixed. Energizing the piezoelectric crystal wafer, by placing voltages between its faces, causes the wafer to flex and move its center inwardly and outwardly relative to its rim in response to its applied voltage. Inward and outward motion of the center of the wafer is delivered through a non-tiltable movable center post (not shown) to the center of a mirror 14 or 16 to cause it to move inwardly and outwardly with the wafer center.

The piezoelectric wafer may be connected electrically with a polarity whereby an increase in voltage causes its associated mirror to move inwardly. Alternatively, it may be connected with a polarity whereby an increase in voltage causes its associated mirror to move outwardly. The invention is described herein with a polarity whereby an increment of voltage shortens the cavity 22 and the length of the ring laser path. A decrement of voltage lengthens the cavity 22.

A curve of beam intensity as a function of the length of the cavity 22, the position of the mirrors 14 or 16, the laser path length, or the voltage delivered to the transducers 32, 34 is substantially sinusoidal as shown in FIG. 2A. The mode peaks are spaced apart one wavelength of the laser beam. It is important and a feature of this invention that the operating point be at one of the mode peaks.

Because the cavity length is linearly related to the mirror position, the abscissa of FIGS. 2A, 2B, 2C and 2D could be labeled "cavity length," "mirror position," or "transducer voltage." Note, however, that the sensitivity of the intensity to changes or perturbations in cavity length, mirror position, or transducer voltage depends upon the position on the curve.

Figure 2C:
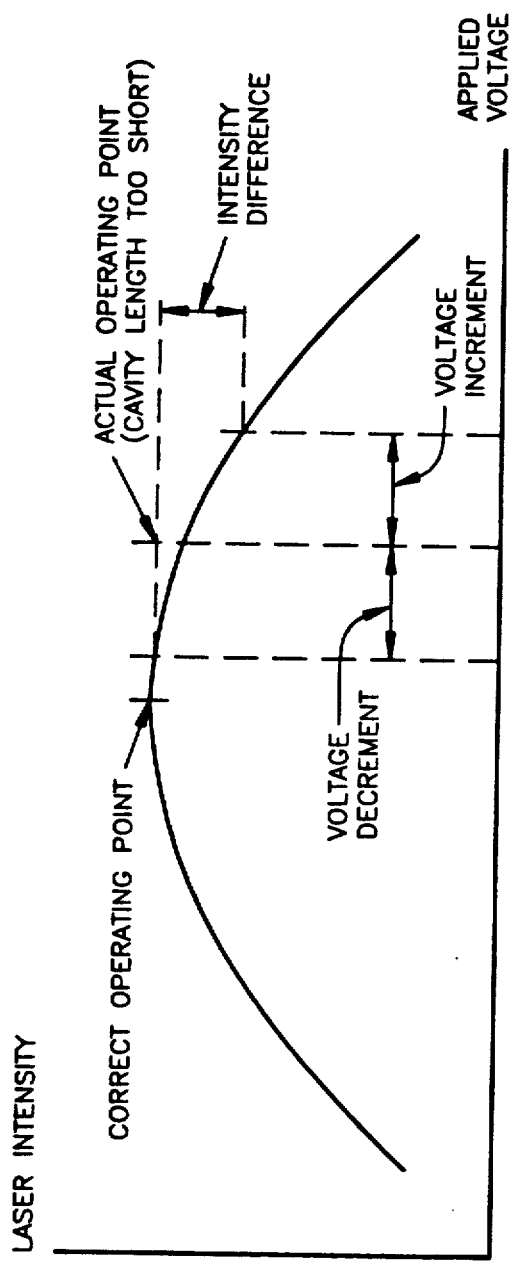
Figure 2D:
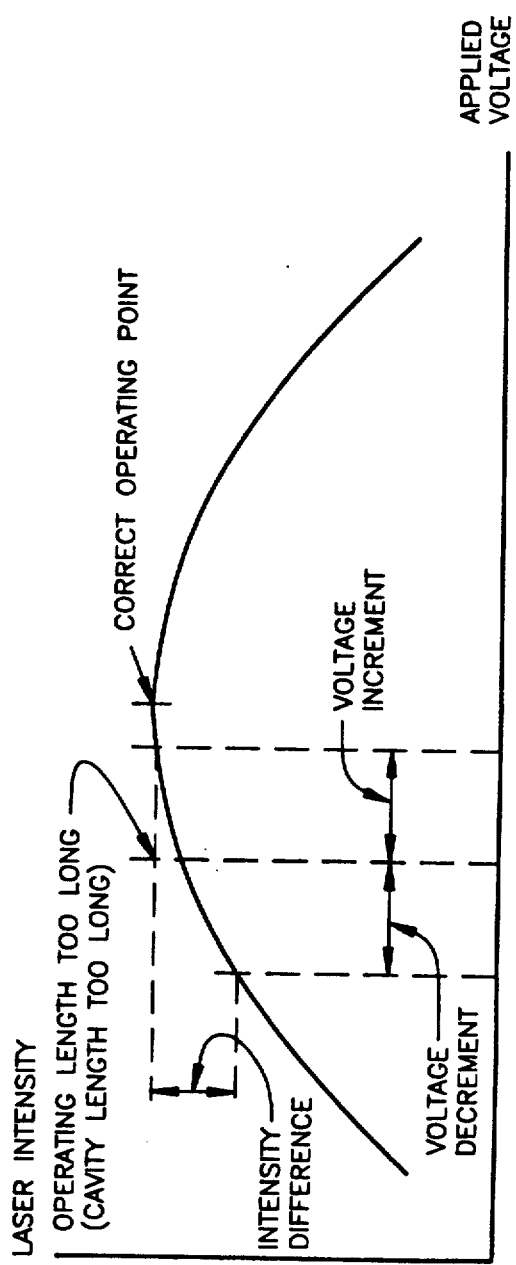

In the vicinity of the mode peaks, the sinusoid may be approximated by a parabola. The parabolic curves of FIGS. 2B, 2C, 2D are plotted against the voltage delivered to the transducers 32, 34. The parabolic curves of intensity against voltage are symmetrical about a voltage corresponding to the peak of the curve. It is desirable that the voltage delivered to transducers 32 and 34 rapidly move toward the nearest mode peak of the curve where the laser beam intensity is maximum. The control servo is thereby prevented from unwanted jumps from one mode peak to the next adjacent mode peak.

The steady voltage component delivered to drive the transducers 32 and 34 is the operating voltage of the transducer, and the corresponding inward and outward positions of the mirrors 14 and 16 are called the operational positions of the mirrors. The corresponding length of the ring laser path is the operating length of the path representing the operating length of the cavity 22.

The sensitivity of the laser intensity to changes in received voltage depends upon the slope of the intensity vs applied voltage curve, and that depends upon the operating voltage of the transducers 32 and 34.

In the following discussion it is assumed that an increment in delivered transducer voltage causes an inward motion of the mirror, shortening the cavity length. A decrement in delivered transducer voltage, it is assumed, produces an outward motion of the mirror and a lengthening of the cavity length. The technique of this invention operates just as effectively if the increment of voltage produces an outward motion, and the decrement of voltage produces an inward motion. The system designer deliberately assigns the directions of motion for the transducer and builds in an a priori evaluation of the corresponding laser intensity synchronized with the polarity of the applied transducer voltages.

Situation: When the operating beam intensity is maximum, as shown in FIG. 2B, the curve of intensity versus applied voltage is substantially flat. Therefore, voltage increments or decrements of equal value cause the laser intensity to decrease in equal amounts from its maximum value. The difference between the values is zero, and the servo control voltage is not changed.

When the operating inward-outward position of a controlling mirror is either inward (as in FIG. 2C) or outward (as in FIG. 2D) from a position of maximum laser intensity (as in FIG. 2B), an increment of delivered transducer voltage produces a different effect, from the effect of a decrement of such voltage, upon the laser intensity.

Situation: The operating position of a mirror is inward from the position corresponding to a mode peak or maximum intensity position as shown in FIG. 2C. The operating cavity length is too short. The operating voltage exceeds its value corresponding to the nearest mode peak. Inward motion of the mirror, an increment of applied voltage, further shortens the cavity length and causes the laser intensity further to decrease. Outward motion of the mirror, a decrement of applied voltage, lengthens the cavity length and causes the laser intensity to increase. There is a negative difference between the laser intensity when a predetermined incremental voltage is delivered to the mirror transducer and the laser intensity when substantially the same amplitude decremental voltage is delivered to the mirror transducer. With the assumed conventions recited above, the servo decreases the operating voltage applied to a transducer to a value corresponding to the nearest mode peak by moving its mirror outward to a value corresponding to the mode peak of the laser intensity.

Situation: The operating position of a mirror is outward from the position corresponding to a mode peak or maximum intensity position, as shown in FIG. 2D. The operating cavity length is too long. The operating voltage is less than its value corresponding to the nearest mode peak. Inward motion of the mirror, an increment of applied voltage, shortens the cavity length and causes the laser intensity to increase. Outward motion of the mirror, a decrement of applied voltage, further increases the cavity length and causes the laser intensity to decrease. There is a positive difference between the laser intensity when a predetermined incremental voltage is delivered to the mirror transducer and the laser intensity when substantially the same amplitude decremental voltage is delivered to the mirror transducer. With the assumed conventions recited above, the servo increases the operating voltage applied to a transducer to a value corresponding to the nearest mode by moving its mirror inward to a value corresponding to the nearest mode peak of the laser intensity.

The beam intensity is monitored, and its incrementing and decrementing sequence, for a given incrementing and decrementing sequence of the applied transducer voltage, creates control signals to move the operational voltage and the cavity length toward a value where the light intensity is at its mode peak value.

In both situations wherein the operating position of the mirror is outward or inward from its optimum position, the difference in intensities is approximately proportional to the error in the operating position, and a linear control servo preferably adjusts the operating value of the voltage to that wherein the laser intensity is maximum.

Thus, the periodic incrementing and decrementing of the transducer control voltage produces control signals for adjusting the operating voltage delivered to the mirror transducers.

Another major feature of the invention is that the digital servo loop gain and the amplitude of the increment and decrement voltages are automatically adjusted to compensate for variations in the key parameters such as absolute gyro laser intensity, piezoelectric transducer sensitivity, and various electronic gains.

The apparatus of the invention controls the servo loop gain in response to the curvature of the intensity vs applied transducer voltage near the operating point. It is part of this invention to compare the intensity at the operating point to the intensity when a voltage increment or decrement is delivered to the transducer. This is accomplished by using a four-segment three-amplitude step-pulsed sequence, instead of a two-amplitude step-pulsed sequence. That is, use three valued, substantially equally timed, voltage pulses, in four segment of an incremented operating voltage state, an operating voltage state, a decremented voltage state, and an operating voltage state.

Consider, for example, when the sensitivity of the transducer to its applied voltage is low, the transducer moves comparatively little for a given input voltage increment or decrement. If that transducer were replaced by a more sensitive one, the amount of motion of the transducer for a given applied voltage change would increase. The change in intensity of the laser beam for a given increment or decrement of voltage is compared to a reference value, and the servo loop gain is automatically adjusted to keep the incremental and decremental changes in laser intensity, for a given increment or decrement of applied voltage, substantially the same for all gyros and for all environments, thereby ensuring consistent performance of the ring laser gyro. The required amplitude of the increments/decrements can be used to adjust the loop gain of the primary cavity length control loop described earlier, thereby ensuring that the time constant of the primary is well controlled under all conditions.

Figure 3:
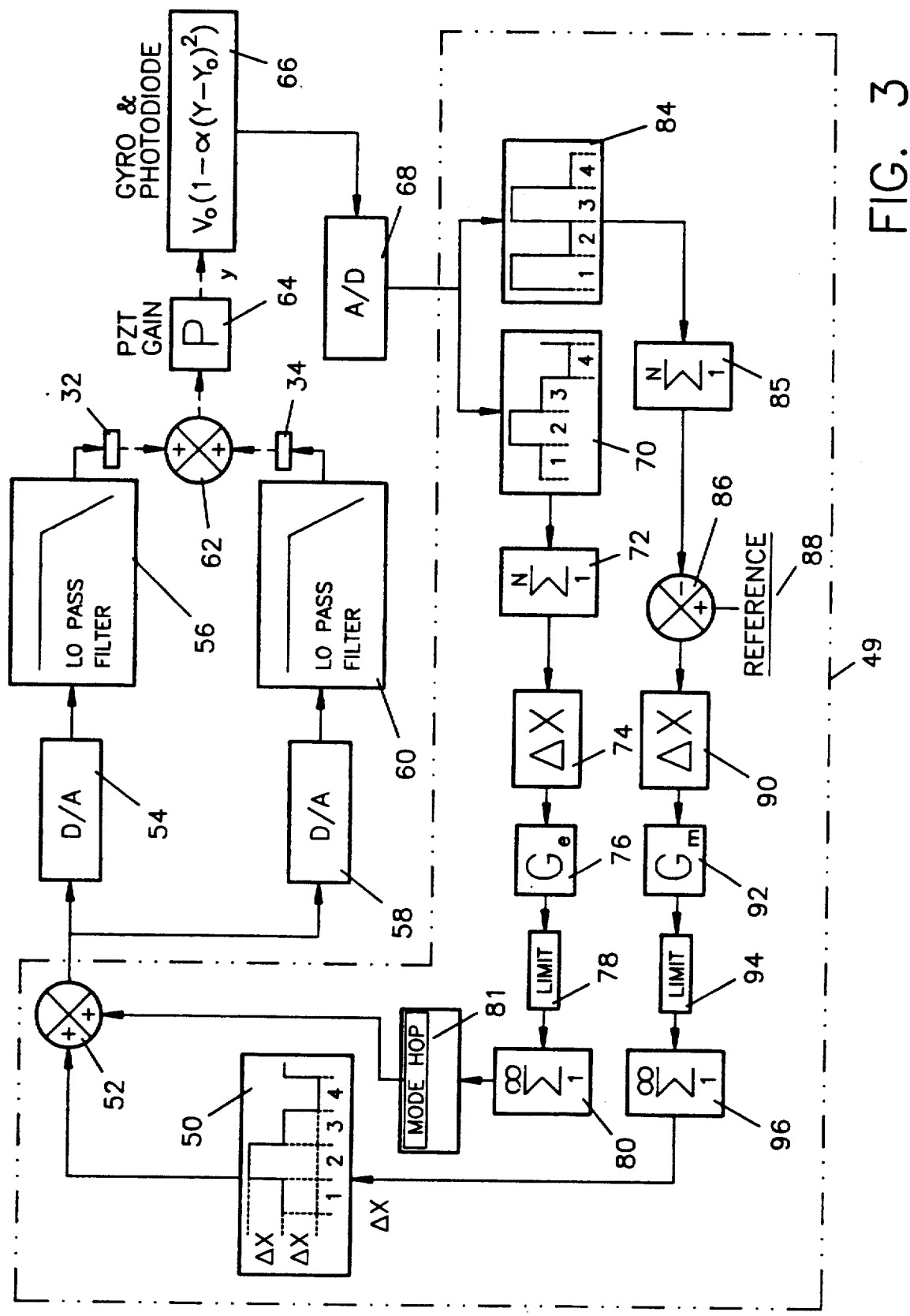
FIG. 3 is a block diagram of a preferred embodiment of the invention, showing the servo loops within a microprocessor.

A block diagram of a preferred embodiment of the invention is shown in FIG. 3. To acquire and maintain the resonant cavity conditions of the ring laser gyro which uses the ring laser of FIG. 1, a control loop is mechanized within the system micro-processor 49. The microprocessor 49 controls the positions of the mirrors 14 and 16 using signals generated by the digital-to-analog converters 54 and 58, and it receives laser intensity information from the optical-sensor 30 through the analog-to-digital converter 68.

The digital-to analog converters 54 and 58 produce analog voltages proportional to the digital input words delivered to them from the summing junction 52 of the microprocessor 49. The digital-to-analog converter 54 delivers transducer applied voltage through the low pass filter 56 to the transducer 32. The low pass filter 56 eliminates or reduces high frequency noise or distortion. The invention can be adequately implemented by only the channel of the digital-to analog converter 54, but the use of two converters to control two different transducers 32 and 34 allows a greater control range.

The optional second digital-to-analog converter 58 delivers transducer applied voltage through the low pass filter 60 to the transducer 34.

The transducers 32 and 34 are preferably piezoelectric or PZT transducers which convert voltage into linear inward and outward movement of their corresponding mirrors 14 and 16.

The mechanical and optical electrical coupling into the ring laser gyro is schematically expressed in FIG. 3 by the mechanical summing junction 62. The block 64 represents the gain of the PZT crystal. The voltages delivered to the transducers 32 and 34 adjust the inward-outward position of mirrors 14 and 16. The amount of motion introduced depends upon the piezoelectric sensitivity of the two transducers 32 and 34, as shown by the presence of block 64. The amount of motion is denoted, "y", and it affects the gyro intensity in a parabolic fashion as shown by the equation in block 66 and as shown by FIGS. 2B, 2C, and 2D. The voltage "$V_o$" represents the voltage corresponding to the peak intensity of the gyro characteristic shown in FIGS. 2B, 2C, and 2D. "$\alpha$" represents the sensitivity to path length errors. Graphically, $\alpha$ is the curvature at the peak of the mode. "$y_o$" is the mirror position of a mirror corresponding to the cavity length at the nearest mode peak.

The signal delivered through the summing junction 52 by the pulsed, stepped, computer generated modulation source 50 to the digital-to-analog converters 54 and 58 is shown graphically within that block. The pulsed voltage is divided into four time slots. In the first and third time slots only the operating voltage is delivered. In the second time slot the operating voltage plus an increment, $\Delta x$, is delivered. In the fourth time slot, the operating voltage minus the decrement, Δx, is delivered. The entire cycle is continuously repeated.

A reading of the laser intensity, measured by the sensor 30, is sampled during each time slot and is delivered through the analog-to-digital converter 68 to the demodulators 70 and 84. While the apparatus 70 and 84 perform demodulation functions, they are implemented very simply using additions and subtractions in the microprocessor. The analog demodulators used in the prior art are not required.

Demodulator 70 produces a signal that is a measure of the difference between the signals sampled during the second and fourth time slots. That difference signal is a measure of the slope, shown in FIGS. 2B, 2C, and 2D, of the characteristic curve near the operating position. When the difference reaches zero, the operating position is at the mode peak. The difference measures slope, and it is analogous to first harmonic demodulation of an analog modulated apparatus.

The output of demodulator 70 is averaged over many cycles, by the summer 72, to remove noise in the signal. The average value of the signal output of the summer is multiplied by the value Δx to produce a signal useful in controlling the gain of the primary loop.

The output of the multiplier 74 is multiplied, in multiplier 76, by a constant $G_e$ which sets the loop gain, or equivalently the time constant of, the primary cavity length control loop. The output of the multiplier 76 is limited by limiter 78 to a reasonable voltage range to prevent spurious readings from severely perturbing the primary loop.

The value of the operating voltage is accumulated in the summer or digital integrator 80. Corrections to the stored operating voltage are made by the signals from the limiter 78.

The amplitude of the operating voltage information is tested in comparator 81 to determine if the operating voltage stored within the summer 80 is within an acceptable predetermined range of a particular mode peak. If the voltage is within such acceptable range, it is delivered to the summing junction 52. If it is outside of the predetermined range, the comparator 81 delivers a voltage to the junction 52 to produce a mode hop change of path length by one wavelength to the vicinity of an adjacent mode peak.

The voltage from summer 80 corresponds to the voltage during time slots 1 and 3 of the signal of block 50. An increment or decrement is added or subtracted from that value during time slots 2 and 4.

The amplitude of the increment or decrement is controlled through a secondary loop which includes demodulator 84. The values of the intensity signals from analog-to-digital converter 68 during time slots 1 and 3 are added, and the values during time slots 2 and 4 are subtracted Thus, to demodulate the signal, only additions and subtractions, at a period that is one-half that of the period of pulses of demodulator 70, are used in the secondary loop of the microprocessor 49. The produced signal is a measure of the curvature of the intensity versus applied voltage curve. This second order term in the curve is analogous to a second harmonic demodulation. The output signal, to filter out fluctuations and noise, is averaged over many cycles by the summer 85. The value produced by summer 85 is subtracted in junction 86 from a predetermined reference value 88, and the difference signal is multiplied by Δx in the multiplier 90 to produce an amplitude error signal for the voltage increments and decrements. The constant multiplier 92 multiplies the signal by a constant $G_m$ to set the time constant of the loop. The limiter 94 prevents spurious measurements from severely perturbing the secondary increment/decrement control loop. The limited voltage is delivered through summer or integrator 96 to produce the signal, Δx which is used for the increment and decrement amplitudes in modulator 50 and multipliers 74 and 90.

The equations are developed below in the "Appendix."

APPENDIX

The intensity for the ring laser gyro beam with the cavity length in the vicinity of a mode center can be expanded into a Taylor series:

$$I = I_o + (dI/dy)|_{y_o}(y - y_o) + (d^2I/dy^2)|_{y_o}(y - y_o)^2 + \quad (1)$$

where "y" is a control variable related to mirror displacement, and "$y_o$" is the value corresponding to the mode peak.

Then, by definition:

$$(dI/dy)|_{y_o} = 0 \quad (2)$$

and $$(d^2I/dy^2)_{y_o} = -\alpha I_o < 0 \quad (3)$$

The intensity equation may be re-written approximately as $$I = I_o(1 - \alpha(y - y_o)^2) \quad (4)$$

or $$V_{PD} = V_o(1 - \alpha(y - y_o)^2) \quad (5)$$

where $V_{PD}$ is the output voltage of the photodiode sensing intensity.

Control Signal Modulation

Let the drive voltage for the PZT transducer be $$Let\ x = x_o + \epsilon_x + x_m \quad (6)$$

where $x_o$ is the mode center control value, $\epsilon_x$ is the error in control value, $x_m$ is the modulation amplitude which $=0, +\Delta x, 0, -\Delta x$ in consecutive time slot sequence.

When, as is usually the situation, equal control signals are applied to both transducers 32 and 34, $$y = 2K_{DAC}Px = 2K_{DAC}P(x_o + \epsilon_x + x_m) \quad (7)$$

where $K_{DAC}$ is the D/A scale factor in terms of volts per least significant bit of the D/A converter, and P is the PZT gain relating the displacements of the transducers to the voltage delivered to their terminals.

$$y_o = 2K_{DAC}Px_o \quad (8)$$

Thus $$y - y_o = 2K_{DAC}P(\epsilon_x + x_m) \quad (9)$$

The photodiode output, according to equation (9) substituted into equation (5), yields $$V_{PD} = V_o(1 - \alpha(2K_{DAC}P(\epsilon_x + x_m))^2) \quad (10)$$

The A/D converter output, "A", is $$A = K_{AD}V_{PD} = K_{AD}V_o(1 - \alpha(2K_{DAC}P(\epsilon_x + x_m))^2) \quad (11)$$
$$= K_{AD}V_o - 4K_{AD}K_{DAC}^2V_o\alpha P^2(\epsilon_x + x_m)^2$$

With the tri-state modulation, three amplitude values are defined for the various time slots:

$$A_o = A|_{xm=o} = K_{AD}V_o - 4K_{AD}K_{DAC}^2V_o\alpha P^2\epsilon_x^2 \quad (12A)$$

$$A_+ = A|_{xm=\Delta x} = K_{AD}V_o - 4K_{AD}K_{DAC}^2V_o\alpha P^2(\epsilon_x^2 + 2\epsilon_x\Delta x + \Delta x^2) \quad (12B)$$

$$A_- = A|_{xm=-\Delta x} = K_{AD}V_o - 4K_{AD}K_{DAC}^2V_o\alpha P^2(\epsilon_x^2 - 2\epsilon_x\Delta x + \Delta x^2) \quad (12C)$$

The equations (12A), (12B), (12C) may be recombined to form a voltage error signal and a gain control signal for use in the two servo loops of FIG. 3. The error signal which is demodulated by demodulator 70 is $$A_+ - A_- = -16K_{AD}K_{DAC}^2V_o\alpha P^2\Delta x\epsilon_x \quad (13)$$

It is noted that $\epsilon_x$ is the error in control voltage that must be driven to zero by the Cavity Length Control loop.

$$(A_+ - A_-)\Delta x = -2K_{TOTAL}\epsilon_x \quad (14)$$

where $K_{TOTAL} = 8K_{AD}K_{DAC}V_o\alpha P^2(\Delta x)^2 = A_o - A_+ + A_o - A_-$. Thus, the second demodulation signal $(A_o - A_+ + A_o - A_-)$ from 84 yields the gain, $K_{TOTAL}$, of the primary cavity length control signal. By adjusting $\Delta x$ so that $K_{TOTAL}$=Constant, a constant cavity length control gain can be maintained. The Gain control signal is $$A_o - A_+ + A_o - A_- = 8K_{AD}K_{DAC}^2V_o\alpha P^2\Delta x^2 \quad (15)$$

Each full cycle of modulation has four time slots, as shown, for example, in box 50. If the demodulation is being summed, for example by summers 72 and 85, over a predetermined number, N, full cycles of modulating (4N time slots) then $$DMOD1 = -16NK_{AD}K_{DAC}^2V_o\alpha P^2\Delta x\epsilon_x \quad (16)$$

and $$DMOD2 = 8NK_{AD}K_{DAC}^2V_o\alpha P^2\Delta x^2 \quad (17)$$

Modulation Control

It is desired to adjust $\Delta x$ such that constant displacement is achieved by making $P\Delta x$=Constant, or equivalently $$DMOD2 = R = \text{Constant}$$

A servo loop mechanizes the servoing of the output of demodulator 84 to a constant.

$$\Delta x_{new} = \Delta x_{old} + G_m(R - DMOD2) \quad (19)$$

Let $\Delta x_o$ be the desired modulation amplitude for a given P. The desired value is determined empirically only once for a class of laser gyros. That is, $$8NK_{AD}K_{DAC}^2V_o\alpha P^2\Delta x_o^2 = R \quad (20)$$

Then, $$\Delta x_{new} = \Delta x_{old} + G_m 8NK_{AD}K_{DAC}^2V_o\alpha P^2(\Delta x_o^2 - \Delta x^2) \quad (21)$$
$$= \Delta x_{old} + G_m R(1 - (\Delta x/\Delta x_o)^2)$$

Let $\Delta x = \Delta x_o + \delta$ where $\delta$ is the deviation of the modulation amplitude from its desired value (chosen empirically). Then $$1 - (\Delta x/\Delta x_o)^2 = -2(\delta/\Delta x_o) - (\delta/\Delta x_o)^2 \approx -(2\delta/\Delta x_o), \quad (22)$$

Substituting (22) into (21):

$$\Delta x_{new} = \Delta x_{old} - 2G_m R(\delta/\Delta x_o) \quad (23)$$

To stabilize the gain, the error signal is multiplied by $\Delta x$, thereby converting a relative error term into an absolute error term. Substituting the update equation yields:

$$\Delta x_{new} = \Delta x_{old} + G_m \Delta x(R - DMOD2) \approx \Delta_{OLD} - 2G_m R\delta. \quad (24)$$

The linearized loop gain is then simply $2G_m R$, and the time constant is $$Y_m = -[\Delta T/\ln|1 - 2G_m R|] \quad (25)$$

where $\Delta T$ is the time interval at which the update is performed.

Mode Tracking

With the modulation control described above, the constant loop gain is independent of PZT efficiency changes of the transducers 32 and 34. Then $$DMOD1 = -16NK_{AD}K_{DAC}^2V_o\alpha P^2\Delta x\epsilon_x. \quad (26)$$

When $\Delta x = \Delta x_o$, then $$DMOD1 = -2R(\epsilon_x/\Delta x) \quad (27)$$

Again, constant loop gain is achieved by multiplying the value of equation 27 by the modulation amplitude to convert from a relative error term to an absolute error term.

The update equation becomes, $$x_{new} = x_{old} + G_e \Delta x(DMOD1) = x_{OLD} - 2G_e R\epsilon_x \quad (28)$$

The loop gain is $-2G_e R$, and the time constant is given by, $$Y_e = -[\Delta T/\ln|1 - 2G_e R|] \quad (29)$$

Stability

Stability is ensured if $|1 - 2G_e R| < 1$ and $|1 - 2G_m R| < 1$.

The following specific values are given by way of example to complete an enabling disclosure. The values and calculations pertain to a specifically designed ring laser gyro.

EXAMPLES

A typical concavity, (E1) $V_o \alpha P^2 \approx 0.0002$ V/V² at $-40°$ C. for a single mirror.

(E2) $V_o \alpha P^2 \approx 0.0006$ V/V² at room temperature for a single mirror. Other typical values are (E3) $K_{DAC} = 130$ V/$2^{11}$ (LSB)$\approx 0.0635$ V/LSB, where LSB means the least significant bit.

(E4) $K_{AD} = 4096$ ct/10.25 V 399.6 ct/V, where ct means the digital count.

(E5) $N = 16$ (E6) Modulation cycle frequency = 512 Hz (E7) Loop Closure frequency = 32 Hz (E8) The amount of voltage needed to jump from one mode peak to the next = 130 V for a single mirror at $-40°$ C.

(E9) Desired total modulation of 8% of mode spacing, or $\pm 5.2$ V modulation on each mirror.

(E10) $K_{DAC} \Delta x_o = 5.2$ (E11) $R = 8NK_{AD}V_o \alpha P^2(K_{DAC}\Delta x_o)^2 = 8*16*399.6*0.0002*(5.2)^2 \approx \approx 277$ counts.

(E12) $Gm \approx 2^{-16}$ (E13) time constant for the modulation control loop, $Y_m \approx 3.7$ seconds (E14) $G_e = 2^{-12}$ (E15) time constant for the mode center control, $Y_e = 0.22$ seconds Obviously, other ring laser gyro designs will need differing parameter values.

Thus, the apparatus of this invention adjusts the inwardly and outwardly movable corner mirrors of a ring laser to produce a maximum intensity ring laser beam. It controls the length of the path of a ring laser to cause the ring laser to operate substantially at its maximum beam intensity. While achieving each of the above goals, it also controls the amount of voltage change required to achieve a given intensity change of the laser. It controls the gain of the primary cavity length controlling means of the laser, and it stabilizes the control loops of the laser.

We claim:

1. A ring laser gyroscope cavity length control system, comprising, in combination:

a ring laser gyroscope defining an optical pathway having electromagnetic propagating waves circulating among at least three corner mirrors comprising said optical pathway, at least one of which is partly transmissive, and at least one of which is movable inwardly and outwardly;

driver means for moving said at least one corner mirror inwardly and outwardly for purposes of cavity length control;

means for providing a controlled activation of said driver means, including;

means for measuring the intensity of electromagnetic propagating waves circulating within said gyroscope;

servo-loop control means for controlling the movement of said at least one mirror which produces a servo-loop control signal that is a function of mirror driver voltage and the change in said electromagnetic propagating wave intensity as such intensity relates to said driver voltage;

gain control means for controlling the gain of the servo-loop control signal of said servo-loop control means, said gain control means producing a gain control signal that is a function of said mirror driver voltage and a sensitivity to the change in said wave intensity as such intensity relates to said driver voltage;

whereby, a stable servo-loop gain is achieved for controlling said at least one mirror.

2. A ring laser gyroscope cavity length control system, comprising:

a ring laser having an optical pathway within a ring cavity, said cavity having at least three corner mirrors, at least one of which is partly transmissive, and at least one of which is movable inwardly and outwardly;

driver means for moving said at least one movable corner mirror inwardly and outwardly to vary the length of said ring laser cavity;

means for measuring the intensity of the electromagnetic waves extracted from said cavity through said partly transmissive mirror, and for producing a signal that is a measure of the intensity of circulating electromagnetic waves within said cavity;

primary servo loop means responsive to said intensity signal to deliver a control signal, that is a function of the intensity of the beams of said laser, to said at least one driver means; and secondary gain control loop means responsive to said intensity signal to control the gain of the signal from said primary servo loop means in response to the second derivative of the intensity of the circulating laser beams to the length of the laser cavity.

3. Apparatus as recited in claim 2 in which:

said primary servo loop means is connected to be responsive to said intensity signal, and including first means for demodulating said intensity signal;

said secondary gain control loop means is connected to be responsive to said intensity signal, and including second means for demodulating said intensity signal with a demodulation function whose repetition period is substantially one-half that of the demodulation function of said first means for demodulating;

said secondary gain control loop means further including means for modulating the signal it produces with a modulation function having substantially the same shape and whose repetition period is substantially the same as that of the demodulation function of said first means for demodulating said intensity signal.

4. Apparatus as recited in claim 3 in which:

said means for modulating and said first and second means for demodulating comprise a stepped modulator and stepped demodulators whose modulating and demodulating functions have synchronized substantially equal time segments;

said modulating function of said means for modulating and said demodulating function of said first means for demodulating each having substantially the same shape with four time segments, its signal steps for one repetitive period having the following sequence: zero, plus an increment, zero, minus a decrement, wherein said increment and decrement of each function have substantially the same magnitude, but the amplitudes of the increments and decrements of said means for modulating may, but not necessarily, have the amplitudes of the increments and decrements of said first means for demodulating;

said demodulating function of said second means for demodulating having a repetitive period of two time segments and the following stepped sequence: a plus increment, then a negative decrement with the amplitudes of the increment and decrement substantially the same.

5. In combination:

a ring laser having at least four corner mirrors, at least one of which is partly transmissive, and at least one of which is movable inwardly and outwardly;

at least one transducer, equal in number to said movable mirrors, each mechanically attached to a different said mirror to move it inwardly and outwardly;

sensing means positioned to intercept laser beams transmitted through said partly transmissive mirrors and to produce an electrical signal that is a measure of the intensity of the laser beams within said ring laser;

analog-to-digital converter means for converting said electrical signal into digital form;

at least one digital-to-analog converter, equal in number to said movable mirrors, each connected to deliver voltage to a different one of said transducers;

primary and secondary computerized servo loops connected between the output of said analog-to-digital converter and the inputs of said digital-to-analog converters;

said primary loop comprising serially connected at least a first stepped voltage demodulator, first digital summing means, first multiplier, second multiplier, and second digital summing means;

said first stepped voltage demodulator demodulating the signal from said analog-to-digital converter in four substantially equal time segments having signals, in sequence, of an operating voltage, an operating voltage plus a predetermined increment, said operating voltage, and operating voltage less a predetermined decrement that is substantially equal to said increment;

said first digital summer being connected to receive the output from said first demodulator to average the value of the demodulated signal over a predetermined number of four-segment cycles of said first demodulator;

said first multiplier being connected to multiply the output of said first summer by a factor $\Delta x$;

said second multiplier being connected to multiply the output of said first multiplier by a constant predetermined value, $G_e$;

said second digital summer being connected to sum the outputs of said second multiplier and to deliver a signal to said digital-to-analog converters;

said secondary loop comprising serially connected a second stepped voltage demodulator, first digital summing means, a comparator means, third multiplier means, fourth multiplier means, fourth digital summing means, and a stepped modulator means;

said second stepped voltage demodulator demodulating the signal from said analog-to-digital converter in two substantially equal time segments having signals, in sequence, of a predetermined increment, and a predetermined decrement that is substantially equal in amplitude to said increment, said time segments being substantially equal to the time segments of said first demodulator;

said third digital summer being connected to receive the output from said second demodulator to average the value of the demodulated signal over a predetermined number of two-segment cycles of said second demodulator;

said comparator being connected to compare the amplitude of the output signal from said second stepped demodulator to a predetermined value and to deliver a signal equal to the difference between said predetermined value and the output of said second demodulator;

said third multiplier being connected to multiply the output of said third summer by a factor $\Delta x$;

said fourth multiplier being connected to multiply the output of said third multiplier by a constant predetermined value, $G_m$;

said fourth digital summer being connected to sum the outputs of said fourth multiplier to produce the signal $\Delta x$;

said stepped modulator being connected to modulate the output of said fourth summer and to deliver the modulated signal to said digital-to-analog converters, said stepped modulator having timed sequence steps that are in the same time sequence and voltages as the sequence of steps of said first demodulator.

6. Apparatus as recited in claim 5 and further comprising a first limiter between said second multiplier and said second digital summer; and a second limiter between said fourth multiplier and said fourth digital summer, to reduce perturbations caused by erratic signals.

7. Apparatus as recited in claim 5 and further comprising a mode hop comparator, said comparator being connected to deliver digital signals to said digital-to-analog converters and to compare the amplitude of the output signal from said second digital summer to a predetermined value to jump the signal to said converters by an amount which causes the mirrors to jump into a position to cause the cavity length to be substantially one laser beam wavelength away from its previous length, whenever the value delivered by said second summer exceeds said predetermined value.

8. Apparatus as recited in claim 7 and further comprising;

a first limiter between said second multiplier and said second digital summer; and a second limiter between said fourth multiplier and said fourth digital summer to reduce signal perturbations.

9. Apparatus as recited in claim 8 in which said ring laser has four legs and four corner mirrors;

two of said corner mirrors being adjustable inwardly and outwardly;

each of said corner mirrors being connected to one of said transducers;

said digital-to-analog transducers being two in number, the output of each being connected to control a different one of said transducers.

10. Apparatus as recited in claim 9 and further comprising two low pass filters, connected, respectively, between said digital-to-analog converters and said transducers.

11. Apparatus as recited in claim 10 in which said transducers are piezoelectric transducers.

* * * * *